United States Patent
Lovci

[11] Patent Number: 5,094,373
[45] Date of Patent: Mar. 10, 1992

[54] SPORTS EQUIPMENT RACK FOR VEHICLE

[76] Inventor: Christopher J. Lovci, 4605 Valley View Dr., Columbus, Nebr. 68601

[21] Appl. No.: 644,197

[22] Filed: Jan. 22, 1991

[51] Int. Cl.$^5$ .......................... B60R 9/00; B60R 11/00
[52] U.S. Cl. ......................... 224/42.08; 224/42.03 B; 224/42.06; 224/282; 224/42.28
[58] Field of Search .................... 224/42.07, 42.03 R, 224/42.03 B, 42.08, 42.06, 282, 42.28, 42.21

[56] References Cited

U.S. PATENT DOCUMENTS

| | | | |
|---|---|---|---|
| 3,326,434 | 6/1967 | Cheadle | 224/42.21 |
| 3,753,520 | 8/1973 | Bodde | 224/42.06 |
| 3,804,308 | 4/1974 | Bodde | 224/42.21 |
| 4,002,364 | 1/1977 | Eshelman | 224/42.06 |
| 4,088,253 | 5/1978 | Saffold | 224/42.03 B |
| 4,434,922 | 3/1984 | Brandsen et al. | 224/314 |
| 4,561,575 | 12/1985 | Jones | 224/42.21 |
| 4,863,080 | 9/1989 | Graber | 224/42.03 B |
| 4,875,608 | 10/1989 | Graber | 224/42.03 B |
| 4,946,084 | 8/1990 | Botto | 224/42.06 |
| 4,948,021 | 8/1990 | Murphy et al. | 224/42.03 B |
| 5,004,133 | 4/1991 | Wyers | 224/42.03 B |

Primary Examiner—Henry J. Recla
Assistant Examiner—Keith Kupferschmid
Attorney, Agent, or Firm—Zarley McKee Thomte Voorhees & Sease

[57] ABSTRACT

An equipment rack for vehicles includes a lower support arm extending generally parallel to the rearward bumper of the vehicle and connectable to the vehicle hitch. An upper swinging arm is pivotally connected to the lower arm and includes a horizontally extending portion and a vertical shaft. The upper arm is connected to the lower arm such that the vertical shaft will swing through an arc away from the rearward end of the vehicle. A locking pin is connectable through apertures in the upper and lower arms to lock the upper and lower arms together to prevent swinging movement of the upper arm. Interchangeable brackets are designed for selective connection to the vertical shaft and have supports thereon for various types of equipment.

6 Claims, 6 Drawing Sheets

SPORTS EQUIPMENT RACK FOR VEHICLE

TECHNICAL FIELD

The present invention relates generally to racks attachable to vehicles for carrying bicycles and the like, and more particularly to an improved swinging rack which is connected to a vehicle towing hitch.

BACKGROUND OF THE INVENTION

There are many bicycle racks and other rack systems available which conventionally attach to the bumper of a vehicle. These prior art racks all suffer one major problem. Namely, they make it difficult, if not impossible, to access the rear of the vehicle while the bicycle or equipment is mounted thereon. Thus, it is necessary to remove the equipment from the rack, and then remove the rack from the vehicle before it is possible to enter the rear storage area of the vehicle.

Another problem with prior art racks is in their limited carrying capabilities. Most conventional racks are designed for a single purpose: for carrying (1) bicycles, (2) skies, (3) spare tire, etc. It is therefore necessary for the vehicle owner to purchase a new rack for each specific type of equipment which is desired to be carried.

It is therefore a general object of the present invention to provide an improved equipment rack for a vehicle.

Another object of the present invention is to provide an equipment rack which permits access to the trunk or rear of the vehicle without dismounting the equipment or rack from the vehicle.

A further object is to provide an equipment rack for a vehicle which may be easily connected and disconnected from the vehicle.

Still another object is to provide an equipment rack for a vehicle which is capable of carrying a variety of equipment.

These and other objects of the present invention will be apparent to those skilled in the art.

SUMMARY OF THE INVENTION

The equipment rack for vehicles of the present invention includes a lower support arm extending generally parallel to the rearward bumper of the vehicle and connectable to the vehicle hitch. An upper swinging arm is pivotally connected to the lower arm and includes a horizontally extending portion and a vertical shaft. The upper arm is connected to the lower arm such that the vertical shaft will swing through an arc away from the rearward end of the vehicle. A locking pin is connectable through apertures in the upper and lower arms to lock the upper and lower arms together to prevent swinging movement of the upper arm. Interchangeable brackets are designed for selective connection to the vertical shaft and have supports thereon for various types of equipment.

DESCRIPTION OF THE PREFERRED EMBODIMENTS

Figure 1:
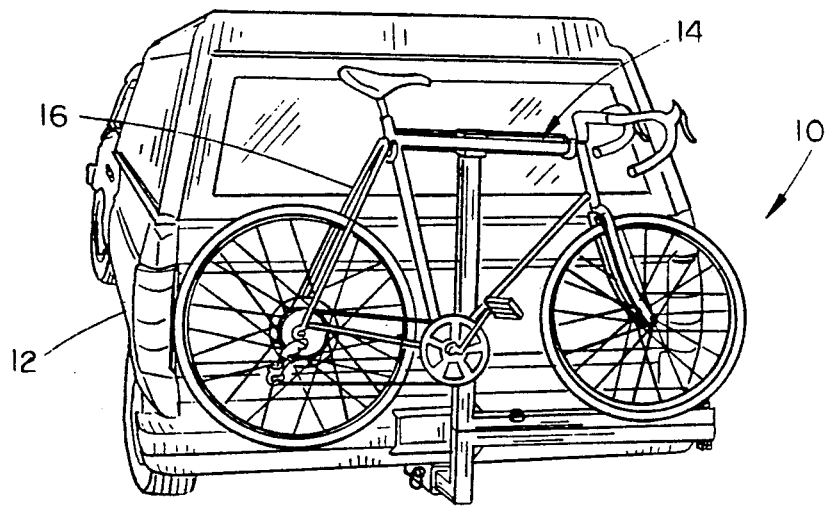
FIG. 1 is a pictorial view of the equipment rack of the present invention mounted on the rear of a vehicle.

Referring now to the drawings, in which identical or corresponding parts are identified with the same reference numeral, and more particularly to FIG. 1, the equipment rack of the present invention is designated generally at 10 and is mounted on the rear of the vehicle 12. The embodiment of FIG. 1 discloses a single bicycle retaining bracket 14 attached to the rack to retain a bicycle 16.

Figure 2:
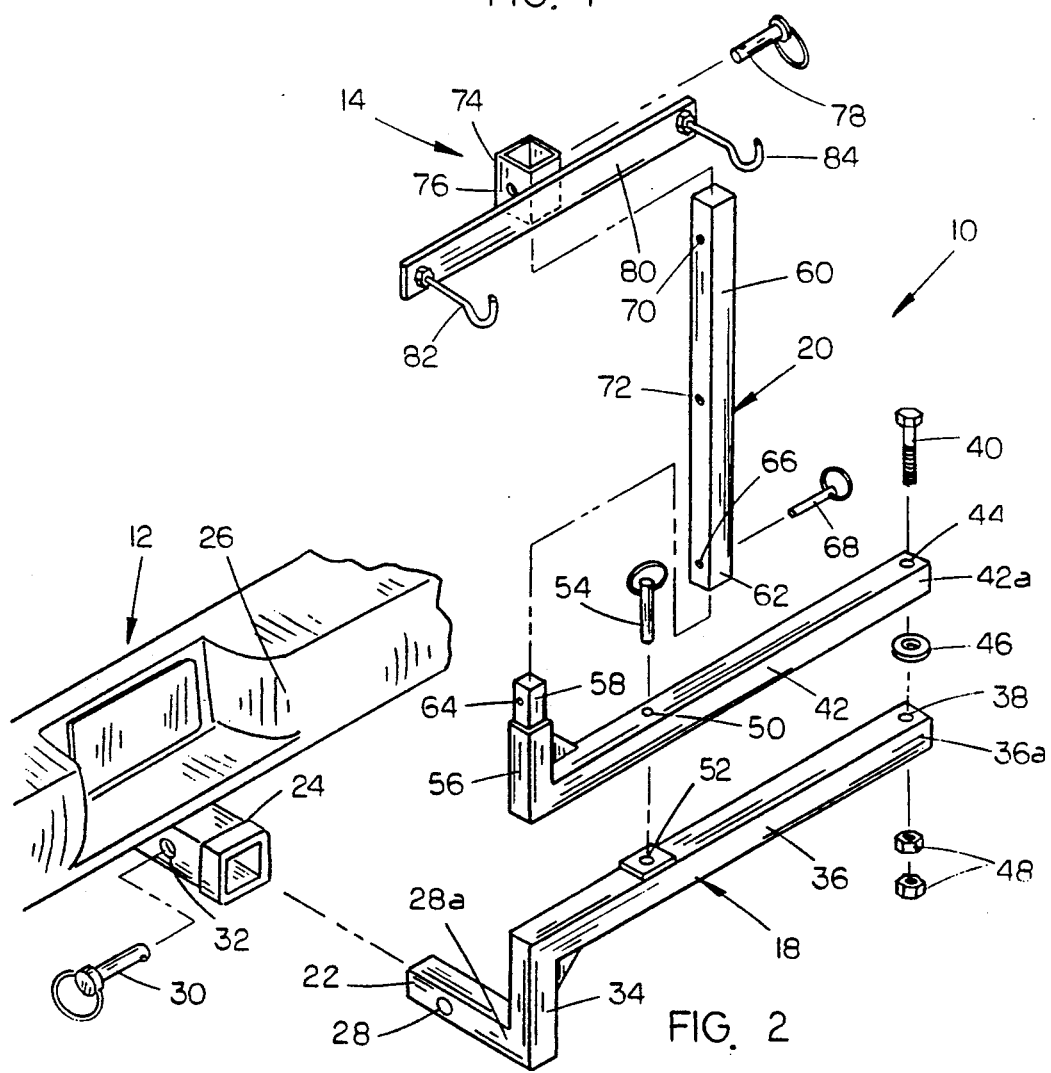
FIG. 2 is an exploded perspective view of the rack with a single bike retaining bracket utilizd therewith.

Referring now to FIG. 2, equipment rack 10 includes a lower support arm 18 and an upper swinging arm 20 pivotally connected to lower arm 18. Lower support arm 18 includes a horizontally rearwardly extending portion 22 which is designed to be received within a conventional receiving hitch 24, mounted on or below the bumper 26 of vehicle 12. An aperture 28 in rearwardly extending portion 22 will receive a selectively lockable pin 30 which extends through apertures 32 in receiving hitch 24, in a conventional fashion, so as to lock lower support arm 18 in position with respect to bumper 26.

An upstanding portion 34 of lower support arm 18 extends upwardly from the forward end 28a of rearwardly extending portion 22. An elongated horizontal portion 36 extends horizontally and generally parallel to bumper 26 from the upper end of upstanding portion 34. The free end 36a of elongated portion 36 has a vertically oriented aperture 38 therethrough which will receive a pivot pin 40, as described in more detail hereinbelow.

Upper swing arm 20 includes a horizontally oriented elongated portion 42 having a length generally the same as that of elongated portion 36 of lower support arm 18. A generally vertically oriented aperture 44 is formed in one end 42a of elongated portion 42, and is oriented coaxial with aperture 38, such that pivot pin 40 may be journaled through both apertures 38 and 44 to permit upper arm 20 to swing about pivot pin 40. Preferably, a bearing 46 is interposed between upper and lower arms 20 and 18 on pivot pin 40. A pair of lock nuts 48 are mounted on the projecting end of pivot pin 40 to lock the pin in place.

A second aperture 50 is located intermediate the length of elongated portion 42 and is aligned with a second aperture 52 in lower arm elongated portion 36, so as to receive a locking pin 54 therethrough to prevent pivoting motion of upper arm 18 about pivot pin 40.

Upper swing arm 20 also includes an upstanding portion 56 connected at its lower end to elongated portion 42. Upstanding portion 56 has a peg 58 projecting from the upper end thereof designed to receive the lower end of a vertical shaft 60. The lower end of vertical shaft 60 is hollow to form a sleeve 62 which will precisely fit over peg 58 such that shaft 60 will be retained in a vertical position by upstanding portion 56. An aperture 64 through peg 58 corresponds with apertures 66 in the sleeve portion 62 of shaft 60 so as to receive a locking pin 68.

As shown in FIG. 2, shaft 60, sleeve portion 62, peg 58 and upstanding portion 56 are preferably square in cross section so as to prevent rotation as shaft 60 on upstanding portion 56. An upper aperture 70 is formed through the upper end of shaft 60, and an intermediate aperture 72 is preferably formed through shaft 60 approximately midway between apertures 66 and 70, for purposes described in more detail hereinbelow.

FIGS. 1-4 disclose a single-bike retaining bracket 14 selectively secured on equipment rack 10. Bracket 14 includes a vertically oriented sleeve 74 having a generally square cross section and an inner diameter which will closely fit vertical shaft 60 to permit shaft 60 to be slidably received therethrough. A pair of opposing apertures 76 through sleeve 74 will register with upper aperture 70 on vertical shaft 60, to permit the journaling of a locking pin 78 therethrough to retain sleeve 74 in position at the upper end of vertical shaft 60. A horizontally oriented elongated bar 80 is affixed to one vertical face of sleeve 74, with sleeve 74 located centrally thereon. A pair of hook members 82 and 84 project horizontally outwardly from the ends of elongated bar 80 and generally parallel to one another. Hook members 82 and 84 are designed to receive the frame of a bicycle to support the same on equipment rack 10, as shown in FIG. 1.

Figure 3:
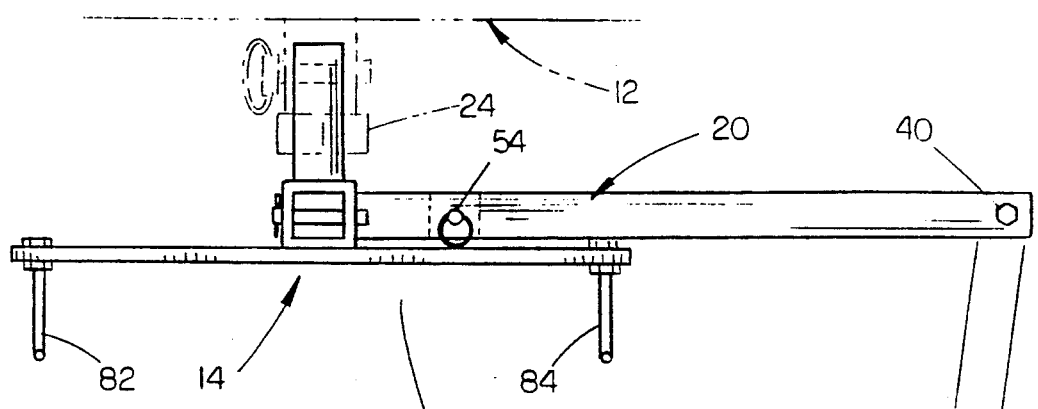
FIG. 3 is a top view of the invention shown in FIG. 2 with movement of a portion thereof indicated in broken lines.
Figure 4:
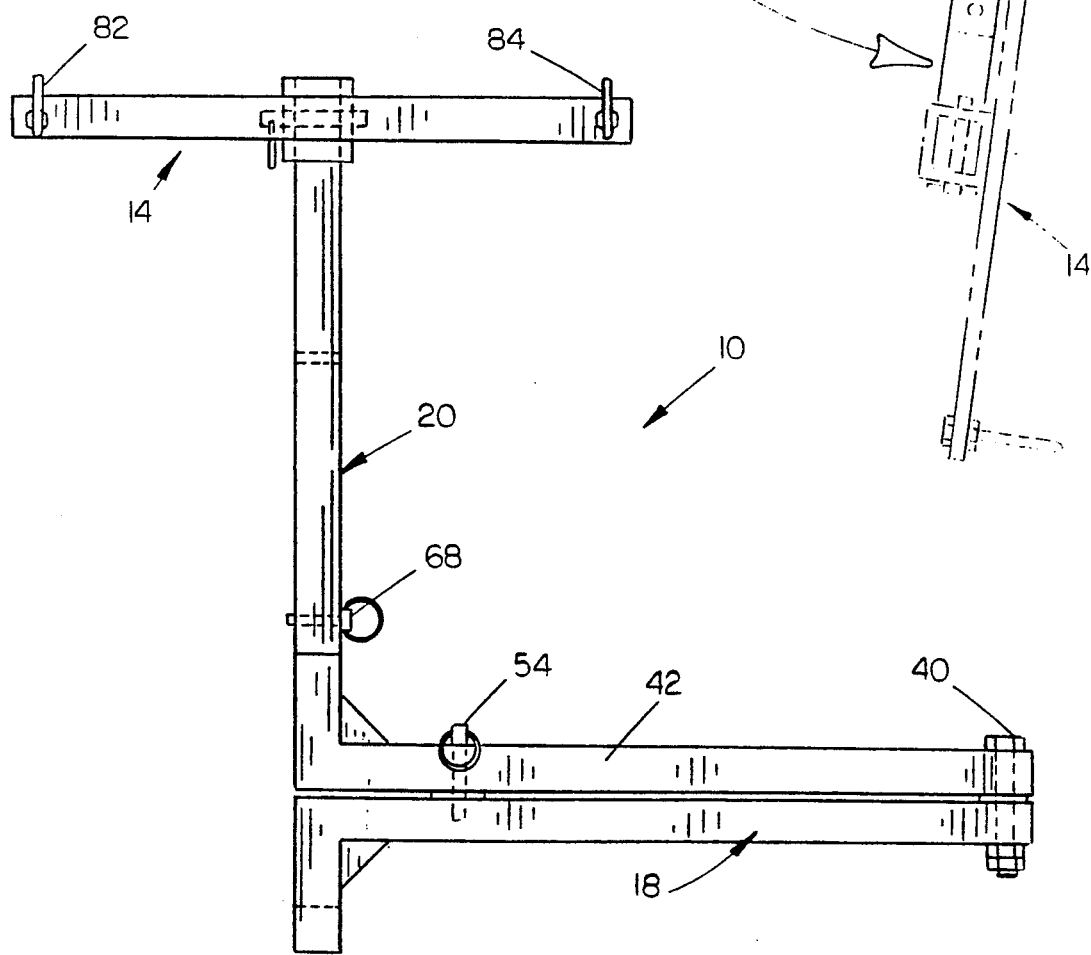
FIG. 4 is a front elevational view of the invention shown in FIG. 2.

FIG. 3 demonstrates the swinging movement of upper arm 20 from the solid line position generally parallel to the rear of vehicle 12, to the broken line position swung outwardly and away from the rear of the vehicle. The location of lower arm 18 at bumper height or below, permits easy access to the rear of the vehicle 12 when upper arm 20 is swung or pivoted on pivot pin 40. The use of a removable shaft 60 connected to upstanding portion 56 permits the entire rack 10 to be broken down and shipped in convenient size packages.

Figure 6:
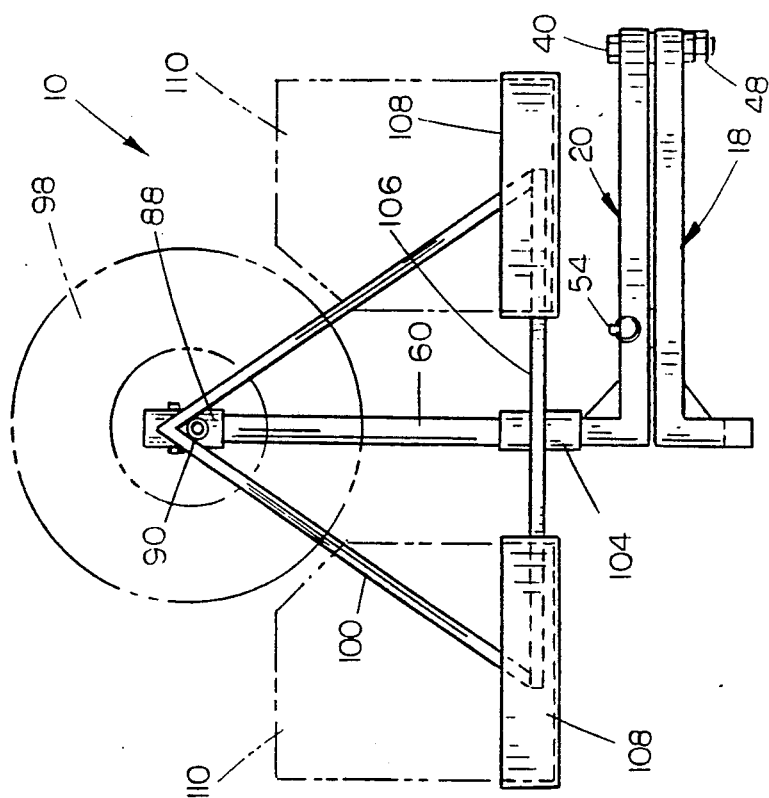
FIG. 6 is a front elevational view of the invention with the bracket of FIG. 5 shown in broken lines mounted thereon.
Figure 5:
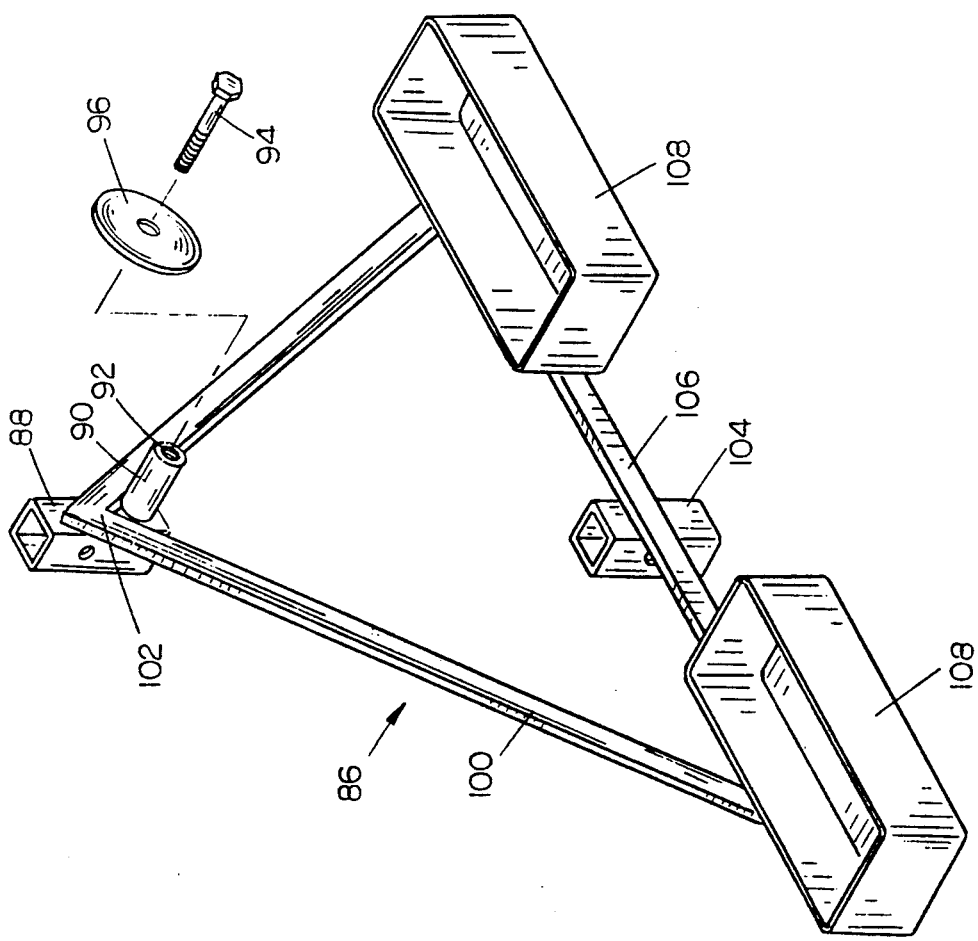
FIG. 5 is a perspective view of a tire and gas container carrier bracket.

Referring now to FIGS. 5 and 6, a tire retention bracket is indicated generally at 86 and may be interchanged with the bike retaining bracket 14 disclosed in FIGS. 1-4. Tire retention bracket 86 includes an upper sleeve 88 with an outwardly projecting cylinder 90 affixed to one vertical face thereof. Cylinder 90 has an interiorly threaded free end 92 which will receive a threaded bolt 94 utilized to fasten a retention plate 96 against a spare tire 98, so as to fasten a spare tire 98 on cylinder 90.

A triangular frame 100 has its apex 102 affixed to upper sleeve 88 and a lower sleeve 104 affixed to its lower horizontal leg 106 in vertical alignment with upper sleeve 88. In this fashion, frame 100 will be retained on vertical shaft 60 by sleeves 88 and 104, as shown in FIG. 6. A pair of open-topped containers 108 are affixed to the ends of lower horizontal leg 106, and are of a size to receive a conventional water or fuel can 110 (shown in broken lines in FIG. 6). In this way, spare tire 98 and fuel cans 110 may be pivoted away from the vehicle when desired by removing locking pin 54 and swinging upper arm 20 on pivot pin 40.

Figure 7:
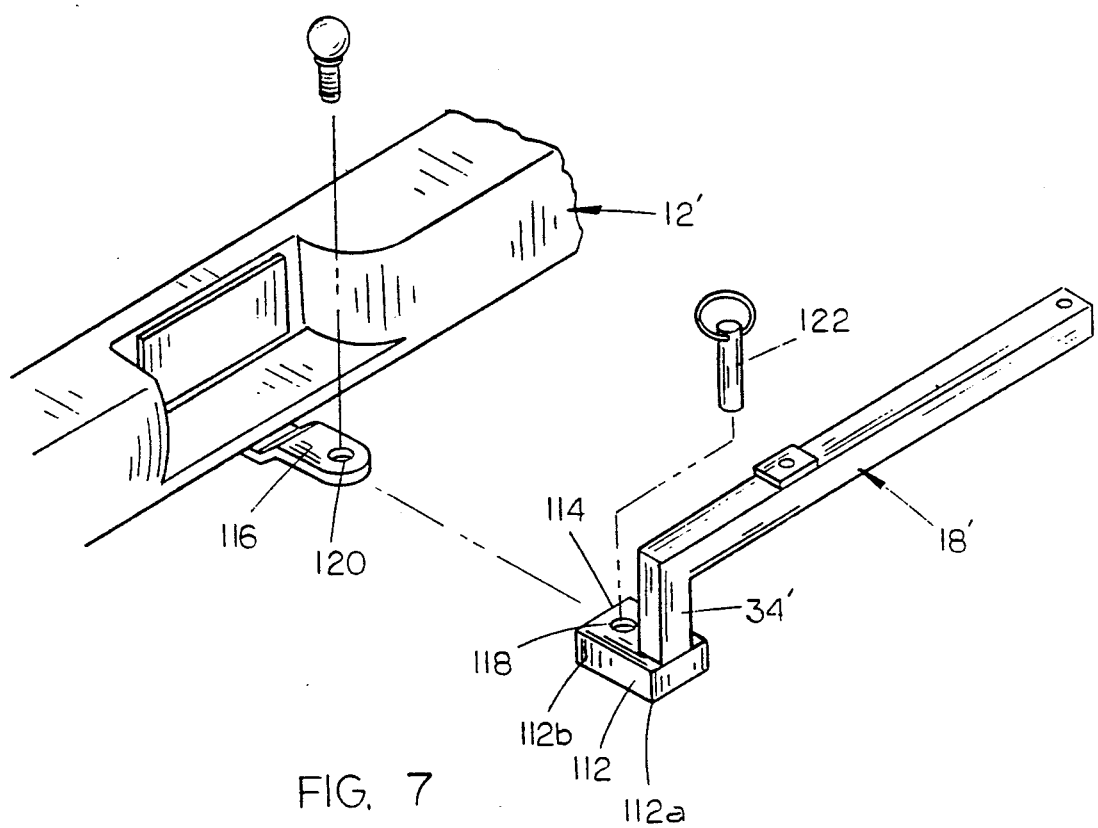
FIG. 7 is a pictorial view of a second embodiment of the invention adapted for use on a draw bar type hitch.
Figure 8:
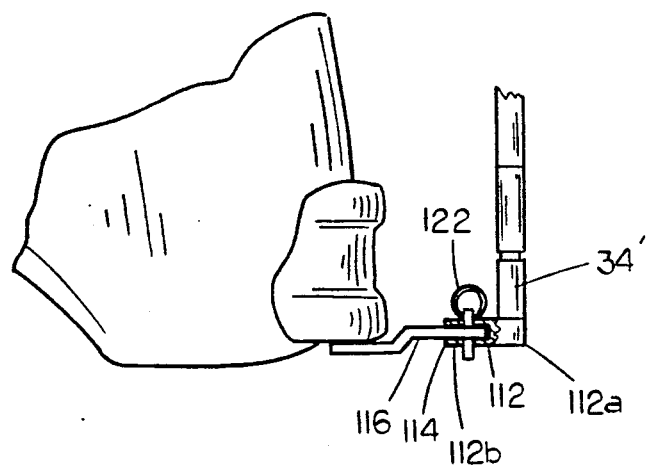
FIG. 8 is a side elevational view with portions shown in section of the invention of FIG. 7.

Referring now to FIG. 7, a second embodiment of lower support arm 18' is disclosed, which includes a hitch receiving box 112 in place of the horizontal rearwardly extending portion 22 of FIG. 2. Hitch receiving box 112 has a forward end 112a connected to the lower end of upstanding portion 34', and a rearward end 112b. The rearward face 114 of box 112 has an opening formed therein which extends forwardly within box 112 and is adapted to receive the end of a fixed draw bar 116 on a vehicle 12'. A pair of apertures 118 are formed in the top and bottom of box 112 and are oriented to align with aperture 120 in draw bar 116 when the end of draw bar 116 is inserted within box 112. A conventional locking pin 122 may then be utilized to lock box 112 on draw bar 116. In this way, equipment rack may be installed on a vehicle with a conventional draw bar 116.

Figure 9:
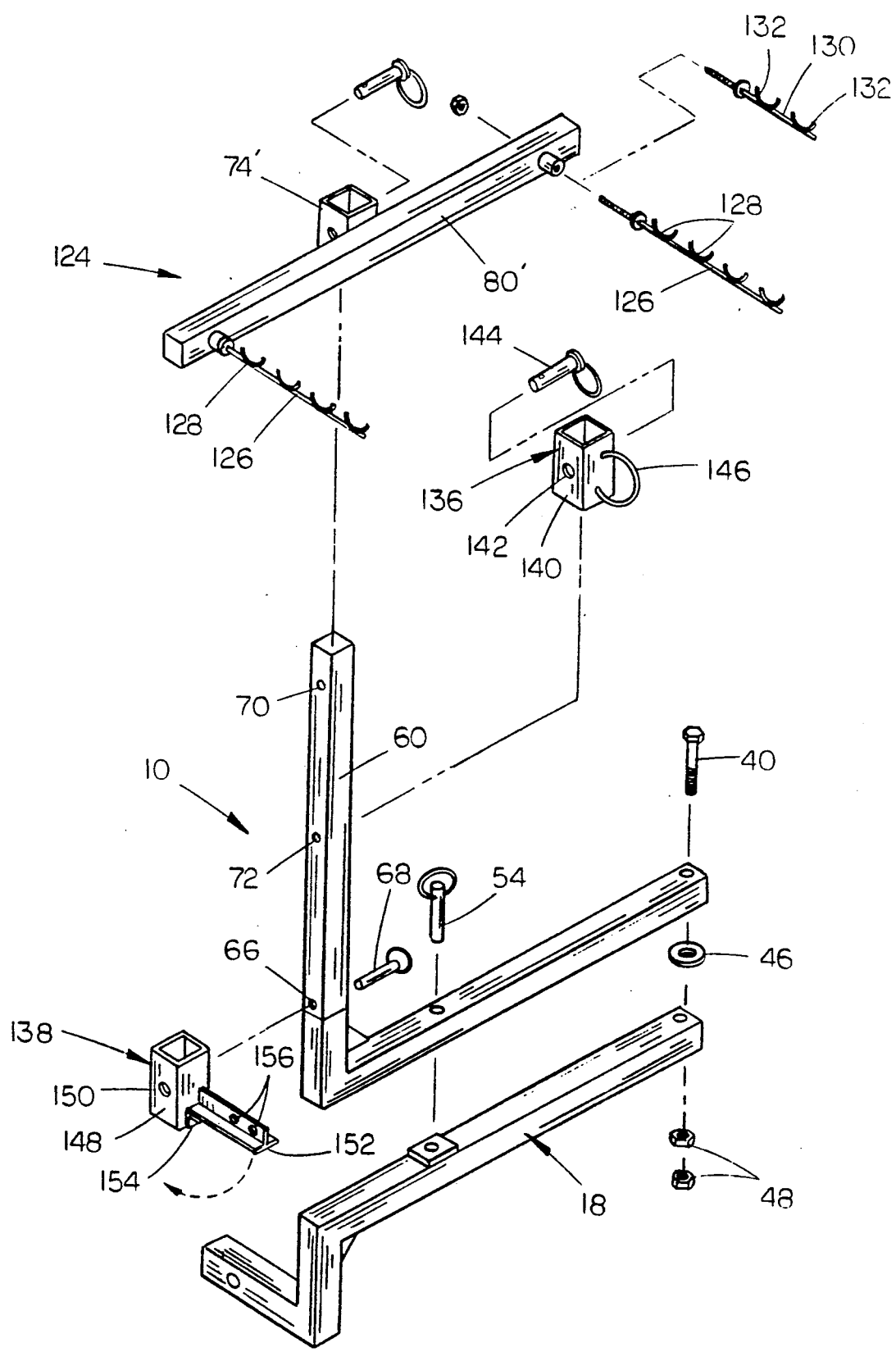
FIG. 9 is an exploded perspective view of the rack with a four-bike retaining bracket utilized therewith.

Referring now to FIG. 9, a four-bike retaining bracket is designated generally at 124 and is designed for use with equipment rack 10. Four-bike bracket 124 is vertically the same as single-bike bracket 14 in the use of a vertically oriented sleeve 74' with an elongated bar 80, mounted horizontally thereto. A pair of hook members 126 are connected to the ends of elongated bar 80' and project horizontally outwardly therefrom. Hook members 126 have a plurality of arcuate retention brackets 128 affixed thereto upon which the frame of a bicycle may be rested. In the embodiment of FIG. 9, four retention brackets 128 are mounted on each hook member 126 so as to enable the vehicle to carry four bikes.

Another embodiment of the hook member is designated generally at 130 and includes two retention brackets 132 and may replace hook members 126 to enable the carrying of two bicycles. Other variations of hook members 126 and 130 may be utilized for the desired number of bicycles.

In addition to four-bike bracket 124, an intermediate bracket 136 and lower bracket 138 are utilized to assist in restraining the bike. Intermediate bracket 136 includes a vertically oriented sleeve 140 having an aperture 142 therethrough for the engagement of a locking pin 144 so as to maintain bracket 136 on vertical shaft 60 at intermediate aperture 72. A rigid loop 146 is affixed to the side of sleeve 140 to which a cable lock may be connected to secure the bicycles to the rack 10.

Lower bracket 138 includes a vertically oriented sleeve 148 with an aperture 150 therethrough for releasable connection to vertical shaft 60 via locking pin 68. An elongated T-bar 152 is connected to sleeve 148 by a hinge 154 such that T-bar 152 may swing from a depending vertical position to a horizontally projecting position. Elastic cords or the like may be hooked around the bicycle frame and into apertures 156 in T-bar 152 to assist in retaining the bike in position. Once the elastic cords (not shown) are removed, T-bar 152 will pivot to a vertical position so that the user does not run into a projecting arm. The two-aperture T-bar 152 shown in FIG. 9 is utilized with the two-bicycle hook members 130. A four-aperture T-bar (not shown) is utilized with the four-bicycle brackets 126.

Figure 10:
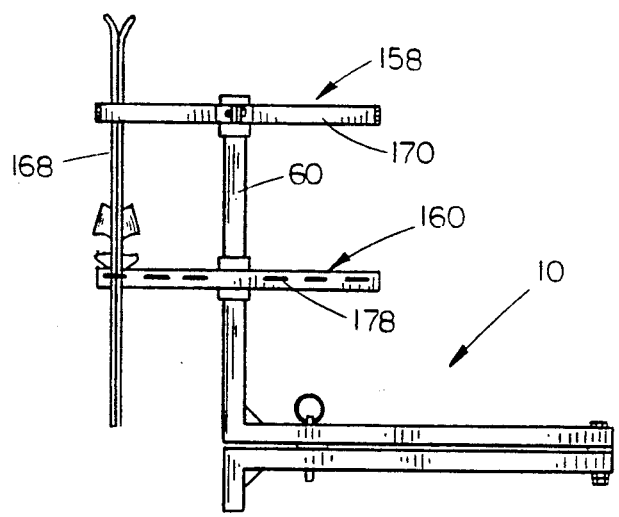
FIG. 10 is a front elevational view of the rack with ski retaining brackets connected thereto.
Figure 11:
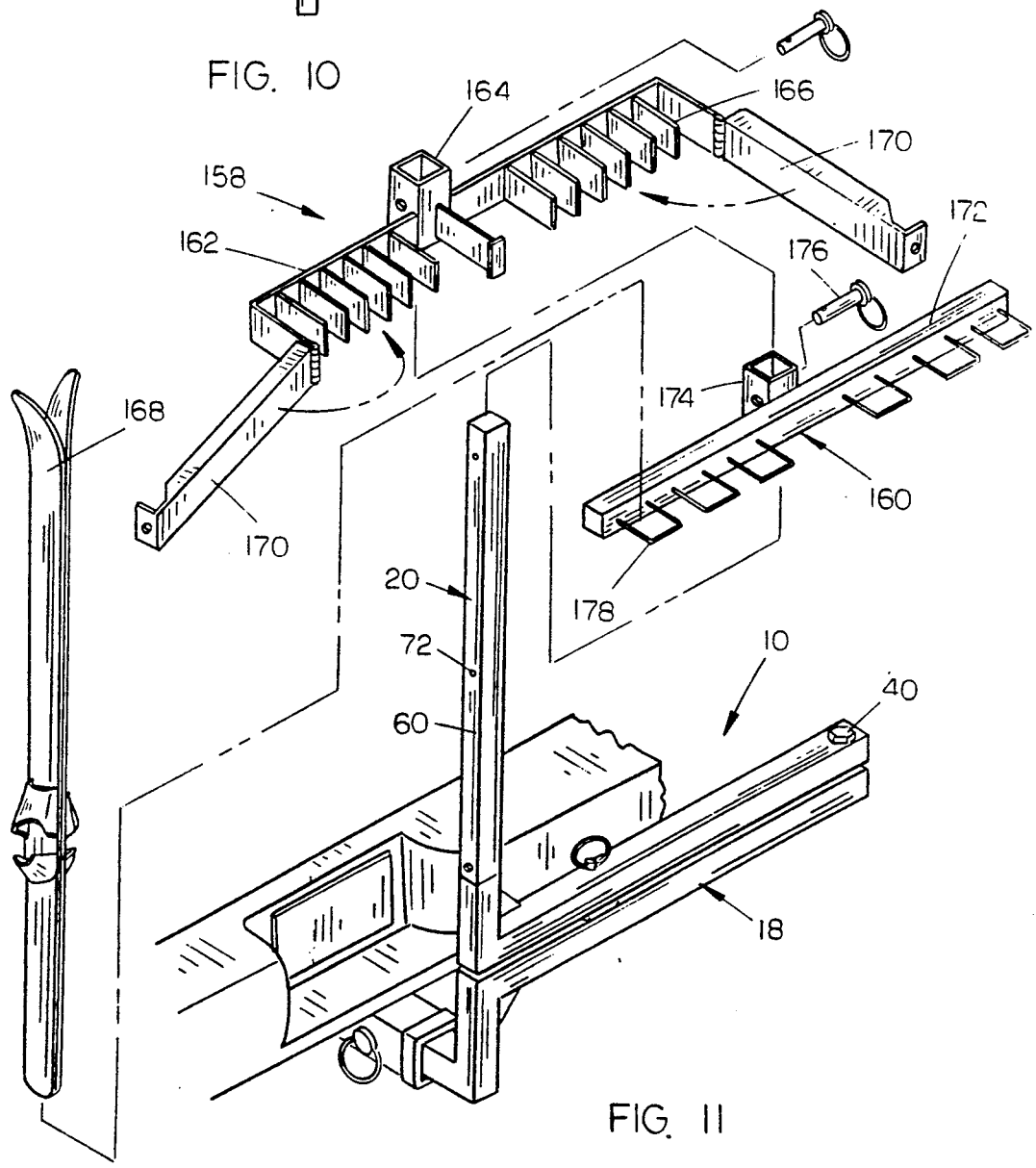
FIG. 11 is an exploded perspective view of the invention of FIG. 10.

Referring now to FIGS. 10 and 11, rack 10 is shown with upper and lower ski retaining brackets 158 and 160 respectively connected to vertical shaft 60 of rack 10. Upper bracket 158 includes a horizontally oriented elongated bar 162 attached to a vertical sleeve 164. A plurality of horizontally spaced apart dividers 166 project from bar 162 and serve to divide skis 168. A pair of arms 170 have a hinge at one end thereof so as to swing closed across the free ends of dividers 166. The free ends of arms 170 may be connected together to lock skis in the dividers Lower bracket 160 includes a horizontally oriented elongated bar 172 mounted on a vertical sleeve 174 which is connected to vertical shaft 60 at intermediate aperture 72 with a conventional locking pin 176. A plurality of rigid loops 178 project from bar 172 and will retain a pair of skis 168 therein.

Whereas the invention has been shown and described in connection with the preferred embodiments thereof, it will be understood that many modifications, substitutions and additions may be made which are within the intended broad scope of the appended claims. There has therefore been shown and described an improved equipment rack for vehicles with a variety of interchangeable brackets for carrying various equipment, which accomplishes at least all of the above stated objects.

I claim:

1. An equipment rack for use with a vehicle:
   said vehicle having a rearward end with as rearward bumper and a hitch on said rearward end, said bumper extending horizontally from side to side of said vehicle and having upper and lower edges and right and left ends; and
   said equipment rack adapted to be removably connected to said hitch, comprising
   a lower support arm adapted to be aligned parallel to said bumper and adapted to extend from said hitch to the right end of said bumper, said lower support arm having first and second ends;
   means on said first end of the lower arm for removably connecting said lower arm to said hitch;
   an upper swinging arm pivotally connected to said lower arm to pivot about a generally vertical axis;
   said upper arm including a horizontal portion having first and second ends, the first end being approximate the first end of said lower arm the second end thereof pivotally connected to the second end of said lower arm;
   said upper arm pivotal from a lock position in which the upper arm horizontal portion is parallel to the lower arm to a swinging position in which the upper arm horizontal portion is generally perpendicular to the lower arm;
   said upper arm including a vertical shaft portion projecting upwardly form the first end of said horizontal portion, such that said shaft may be swung through an arc parallel to the pivotal axis;
   means for selectively locking said upper arm with respect to the lower arm to prevent pivotal movement; and
   means removably connected to said upper arm shaft for pivotal movement therewith, for supporting a predetermined piece of equipment on said shaft.

2. The combination of claim 1, wherein said lower support arm is connected to said hitch so as to be located no higher than the upper edge of said bumper, to permit access to the rearward end of the vehicle when the upper arm is in the swinging position.

3. The combination of claim 1, wherein the horizontal portion of said upper arm is of a length substantially equal to the lower arm, such that said vertical shaft is vertically aligned with said hitch and generally centered adjacent the rearward end of the vehicle.

4. The combination of claim 3, wherein the pivotal axis is located adjacent the right end of said bumper to swing said vertical shaft away from the rearward end of the vehicle to permit complete access to the rearward end of the vehicle.

5. The combination of claim 1, wherein said hitch is of the type having a horizontally and rearwardly extending hollow tubular end with apertures therein for receipt of a locking pin, and wherein said means for removably connecting the lower arm to the hitch includes a forwardly extending portion for journaling within said hollow tubular end, and further includes apertures through said forwardly extending portion for alignment with said apertures in the hollow tubular end for receipt of said locking pin.

6. The combination of claim 1, wherein said hitch is of the type having a horizontally and rearwardly extending flat bar with an aperture therethrough for receipt of a hitch ball, and wherein said means for removably connecting the lower arm to the hitch includes a forwardly extending portion with a forwardly open pocket adapted to receive the rearward end of said bar therein, an aperture through said forwardly extending portion adapted for alignment with said hitch ball aperture, and locking pin means for journaling through said apertures in said forwardly extending portion and said bar to lock said lower arm on said bar.

* * * * *